US012759899B2

(12) United States Patent
Li et al.

(10) Patent No.: US 12,759,899 B2
(45) Date of Patent: Oct. 13, 2026

(54) METHOD FOR PREPARING SODIUM-ION BATTERY CATHODE MATERIAL

(71) Applicant: Power Ahead Group, Inc, Boulder, CO (US)

(72) Inventors: Huiyan Li, Shanghai (CN); Yunru Zhang, Shanghai (CN); Quanying Zhang, Shanghai (CN); Faxing Ma, Shanghai (CN)

(73) Assignee: Power Ahead Group, Inc, Boulder, CO (US)

( * ) Notice: Subject to any disclaimer, the term of this patent is extended or adjusted under 35 U.S.C. 154(b) by 16 days.

(21) Appl. No.: 19/201,987

(22) Filed: May 8, 2025

(65) Prior Publication Data

US 2026/0035264 A1 Feb. 5, 2026

(30) Foreign Application Priority Data

Jul. 30, 2024 (CN) ........................ 202411031369.9

(51) Int. Cl.
*H01B 1/08* (2006.01)
*C01G 53/51* (2025.01)
(Continued)

(52) U.S. Cl.
CPC ............... *C01G 53/51* (2025.01); *H01B 1/08* (2013.01); *H01M 4/505* (2013.01); (Continued)

(58) Field of Classification Search
CPC ... H01B 1/00; H01B 1/06; H01B 1/08; C01G 53/51; H01M 4/0471; H01M 4/505; H01M 4/525; H01M 10/054
See application file for complete search history.

(56) References Cited

U.S. PATENT DOCUMENTS 10,249,873 B2 * 4/2019 Kim ..................... C01G 23/005
2014/0312269 A1 * 10/2014 Laumann ............... C01G 23/00 429/231.1
2026/0179944 A1 * 6/2026 Koshika ................. C01G 53/42

FOREIGN PATENT DOCUMENTS

EP 4614606 A1 * 9/2025 ............. C01G 53/40

OTHER PUBLICATIONS

Tantis et al "Highly functional titania nanoparticles produced by flame spray pyrolysis. Photoelectrochemical and solar cell applications", Applied Catalysis B: Environmental 182 (2016) 369-374.*
(Continued)

*Primary Examiner* — Mark Kopec
(74) *Attorney, Agent, or Firm* — Bayramoglu Law Offices LLC

(57) ABSTRACT

A method for preparing a sodium-ion battery cathode material includes: compounding metal salt solutions to obtain a mixed metal salt solution, where metal sources include one or more of nickel, iron, and manganese; performing spray pyrolysis on the mixed metal salt solution to obtain a first precursor powder; mixing the first precursor powder with an isopropanol solvent to obtain a first mixed solution; dispersing nano-scale titanium dioxide into the first mixed solution to obtain a second mixed solution; drying the second mixed solution to obtain a second precursor powder; and mixing the second precursor powder with a sodium source for sintering to obtain a sodium-ion battery cathode material. A titanium-doped sodium-ion battery cathode material is prepared by adding a heterogeneous element titanium to suppress a phase change at the beginning of the charging, thereby improving the structure stability, output characteristic, and service life of the sodium-ion battery.

18 Claims, 5 Drawing Sheets

(51) Int. Cl.
*H01M 4/505* (2010.01)
*H01M 10/054* (2010.01)

(52) U.S. Cl.
CPC ....... *H01M 10/054* (2013.01); *C01P 2002/54* (2013.01); *C01P 2002/72* (2013.01); *C01P 2006/40* (2013.01)

(56) References Cited

OTHER PUBLICATIONS

Luo et al "P2-type transition metal oxides for high performance Na-ion battery cathodes", J. Mater. Chem. A,2017,5, 18214.*
Choi et al "One-pot rapid synthesis of core-shell structured NiO@TiO2 nanopowders and their excellent electrochemical properties as anode materials for lithium ion batteries", Nanoscale, 2013, 5, 12645.*
Ernst et al "Electrochemically active flame-made nanosized spinels: LiMn2O4, Li4Ti5O12 and LiFe5O8", Materials Chemistry and Physics 101 (2007) 372-378.*

* cited by examiner

METHOD FOR PREPARING SODIUM-ION BATTERY CATHODE MATERIAL

CROSS REFERENCE TO THE RELATED APPLICATIONS

This application is based upon and claims priority to Chinese Patent Application No. 202411031369.9, filed on Jul. 30, 2024, the entire contents of which are incorporated herein by reference.

TECHNICAL FIELD

The present disclosure relates to the technical field of sodium-ion batteries, and specifically to a method for preparing a sodium-ion battery cathode material.

BACKGROUND

Today's problems of overconsumption of fossil energy sources and the environmental pollution caused by their combustion are becoming increasingly serious. Energy shortage and environmental degradation have become the core issues threatening the survival and development of mankind. The development of new energy sources has become a major issue that needs to be solved. A sodium-ion battery system has received widespread attention in recent years due to its abundant resources, low price, environmental friendliness, and similar electrochemical properties to lithium-ion batteries, thereby providing a new option for electrochemical energy storage, especially large-scale energy storage.

Recently, research on sodium-based secondary batteries (hereinafter referred to as "sodium-ion batteries"), which use sodium instead of lithium, has received attention once again. Sodium resources are abundant, such that if the lithium can be replaced with the sodium to make the secondary batteries, the secondary batteries may be manufactured at a low cost.

In order to commercialize the sodium-ion batteries, research on an important material-cathode material active substance is being actively performed. In particular, metal oxides $NaMO_2$ (M=Mn, Fe, Co, Ni, etc.) with a layered structure have attracted attention as cathode material active substances with high commercialization possibilities. However, there is a problem of accelerated degradation of the service life of the sodium-ion batteries caused by multi-stage structural changes in charging and discharging.

SUMMARY

In views of disadvantages in the related art, the present disclosure provides a method for preparing a sodium-ion battery cathode material.

Disclosed in the present disclosure is a method for preparing a sodium-ion battery cathode material. The preparation method includes the following operations.

Metal salt solutions are compounded to obtain a mixed metal salt solution, where the mixed metal salt solution includes one of a chloride solution, a sulfate solution, and a nitrate solution, and metal sources in the mixed metal salt solution include one or more of nickel (Ni), iron (Fe), and manganese (Mn).

Spray pyrolysis is performed on the mixed metal salt solution to obtain a precursor powder A.

The precursor powder A is mixed with an isopropanol solvent to obtain a mixed solution A.

Nano-scale titanium dioxide is dispersed into the mixed solution A to obtain a mixed solution B.

The mixed solution B is dried to obtain a precursor powder B.

The precursor powder B is mixed with a sodium source for sintering, so as to obtain a sodium-ion battery cathode material.

As a further improvement of the present disclosure, a structure of the sodium-ion battery cathode material is $NaM_{1-x}Ti_xO_2$; and in the formula, M is selected from at least one of Ni, Fe, or Mn, and $0.01<x<0.1$.

As a further improvement of the present disclosure, process parameters for spray pyrolysis include the following.

The mixed metal salt solution is sampled through pneumatic nebulization, and a pressure range of compressed air is 1-5 $kg/cm^2$.

A feeding rate of solution droplets is 5-35 L/min, a particle size range of the solution droplets is $0<D_{50}<300$ μm, and a falling speed of the solution droplets in a baking furnace is 5-40 m/s.

A furnace chamber temperature of the baking furnace is 300° C.-1000° C., and a retention time of the solution droplets in a furnace chamber is 10-30 s.

As a further improvement of the present disclosure, the process parameters for spray pyrolysis further include the following.

A combustion-supporting gas of the baking furnace is natural gas, and a nozzle diameter for spray pyrolysis is 1-3 mm.

As a further improvement of the present disclosure, the feeding rate of the solution droplets is 7-15 L/min, and the furnace chamber temperature of the baking furnace is 500° C.-800° C.

As a further improvement of the present disclosure, a post-treatment of the precursor powder A includes the following.

Washing: a chloride ion concentration in water is <1 ppm, a washing solid-liquid ratio is 1:10, and the number of times for washing is ≥2.

Drying: a drying temperature is 90° C.-100° C.

Crushing: crushing is performed by using a crushing and grinding basket through a zirconia grinding disc.

Screening: screening uses a 100-200-mesh sieve.

As a further improvement of the present disclosure, a drying temperature of the mixed solution B is 40-80° C., so as to volatilize isopropanol.

As a further improvement of the present disclosure, the sodium source is sodium carbonate or sodium sulfate, and a molar mass ratio of sodium atoms to a total molar mass ratio of mixed metals in the precursor powder B is 0.9-1.0.

As a further improvement of the present disclosure, the precursor powder B and the sodium source are mixed and then baked for 14-34 h at 760-960° C., so as to obtain the sodium-ion battery cathode material.

As a further improvement of the present disclosure, the preparation method further includes the following operation.

The sintered sodium-ion battery cathode material is cooled to room temperature, and crushing, grinding, and sieving are performed.

Compared with the related art, the present disclosure has the following beneficial effects.

The present disclosure prepares a titanium-doped sodium-ion battery cathode material by adding a heterogeneous element titanium, so as to suppress a phase change at the beginning of the charging of a sodium-ion battery, thereby improving the structure stability, output characteristic, and service life of the sodium-ion battery.

The process of preparing a sodium-ion battery precursor material of the present disclosure is a dry process, the addition of any complexant or binder is not required, and the addition of acidic or alkaline agents to regulate the pH is also not required, such that high concentration wastewater that is difficult to treat is not produced, thereby greatly reducing operating costs. Furthermore, the sodium-ion battery precursor material prepared in the present disclosure is at nanoscale (nm), simple in process step, easy in raw material obtaining, easy to implement, and suitable for large-scale production application.

DETAILED DESCRIPTION OF THE EMBODIMENTS

In order to make objectives, technical solutions, and advantages of embodiments of the present disclosure clearer, the technical solutions in the embodiments of the present disclosure will be clearly and completely described below in combination with the drawings in the embodiments of the present disclosure. It is apparent that the described embodiments are part of the embodiments of the present disclosure, not all the embodiments. Based on the embodiments in the present disclosure, all other embodiments obtained by those of ordinary skill in the art without creative work shall fall within the protection scope of the present disclosure.

The present disclosure is further described in detail below with reference to the drawings.

Figure 1:
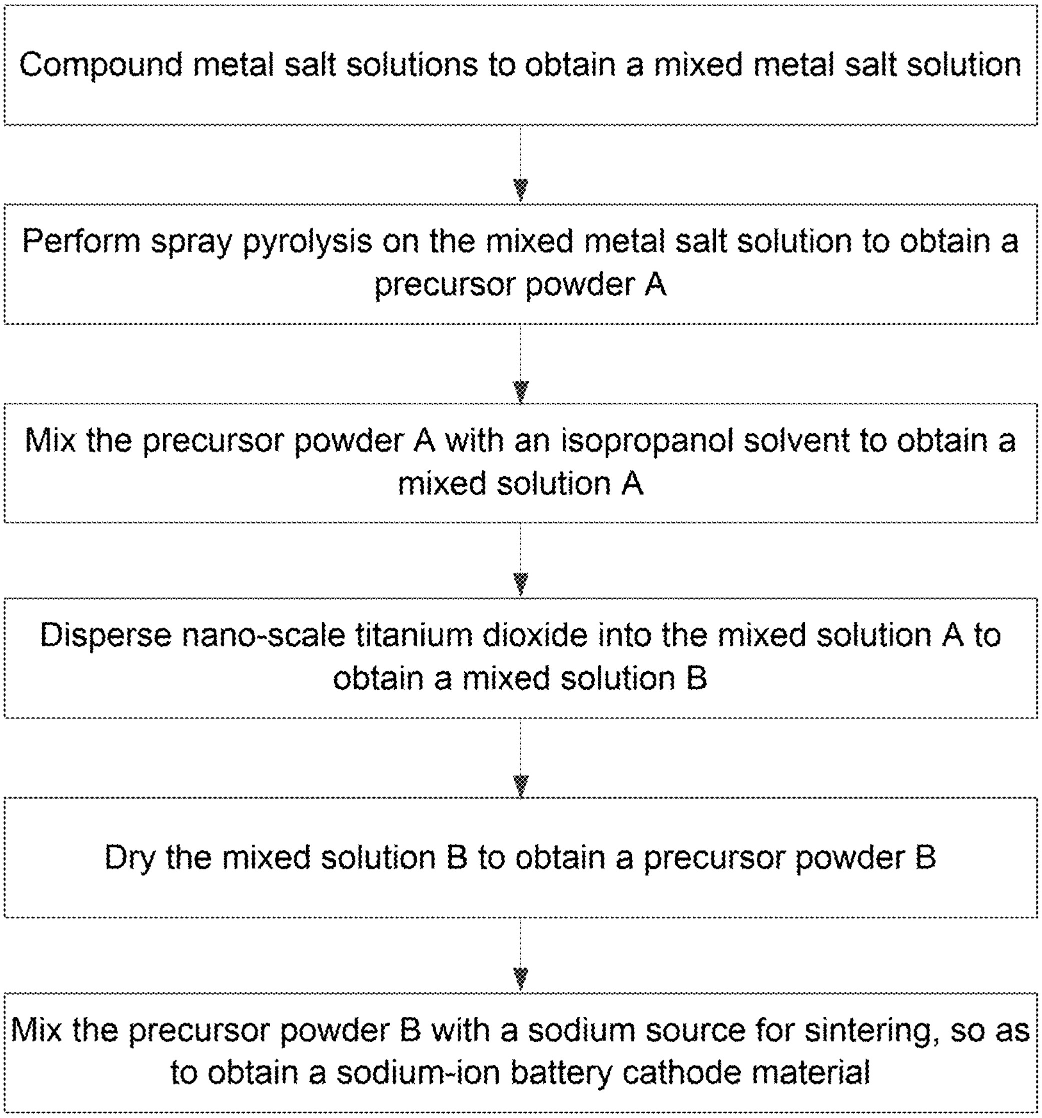
FIG. 1 is a flowchart of a method for preparing a sodium-ion battery cathode material according to the present disclosure.

As shown in FIG. 1, the present disclosure provides method for preparing a sodium-ion battery cathode material. The preparation method includes the following steps.

At S1, metal salt solutions are compounded to obtain a mixed metal salt solution, where the mixed metal salt solution includes nickel, iron, and manganese chloride solutions.

At S2, spray pyrolysis is performed on the mixed metal salt solution to obtain a precursor powder A, where process parameters for spray pyrolysis include: the mixed metal salt solution is sampled through pneumatic nebulization, and a pressure range of compressed air is 1-5 kg/cm$^2$; a feeding rate of solution droplets is 5-35 L/min, a particle size range of the solution droplets is $0<D_{50}<300$ μm, and a falling speed of the solution droplets in a baking furnace is 5-40 m/s; a furnace chamber temperature of the baking furnace is 300° C.-1000° C., and a retention time of the solution droplets in a furnace chamber is 10-30 s; a combustion-supporting gas of the baking furnace is natural gas, and a nozzle diameter for spray pyrolysis is 1-3 mm; and the feeding rate of the solution droplets is 7-15 L/min, and the furnace chamber temperature of the baking furnace is 500° C.-800° C.

Further, the preparation method further includes performing a post-treatment on the precursor powder A. The post-treatment includes the following.

Washing: a chloride ion concentration in water is <1 ppm, a washing solid-liquid ratio is 1:10, and the number of times for washing is ≥2.

Drying: a drying temperature is 90° C.-100° C.

Crushing: crushing is performed by using a crushing and grinding basket through a zirconia grinding disc.

Screening: screening uses a 100-200-mesh sieve.

At S3, the precursor powder A is mixed with an isopropanol solvent to obtain a mixed solution A.

At S4, nano-scale titanium dioxide is dispersed into the mixed solution A to obtain a mixed solution B.

At S5, the mixed solution B is dried at 40-80° C. to volatilize isopropanol, so as to obtain a precursor powder B.

At S6, the precursor powder B and the sodium source are mixed and then baked for 14-34 h at 760-960° C., so as to obtain the sodium-ion battery cathode material, where the sodium source is sodium carbonate or sodium sulfate, and a molar mass ratio of sodium atoms to a total molar mass ratio of mixed metals in the precursor powder B is 0.9-1.0; a structure of the sodium-ion battery cathode material is $NaM_{1-x}Ti_xO_2$; and in the formula, M is selected from at least one of Ni, Fe, or Mn, and $0.01<x<0.1$, for example, the sodium-ion battery cathode material is $Na(Ni_{0.25}Fe_{0.25}Mn_{0.5})_{0.97}Ti_{0.03}O_2$.

Further, the preparation method further includes the following operation.

The sintered sodium-ion battery cathode material is cooled to room temperature, and crushing, grinding, and sieving are performed.

The present disclosure had the following advantages.

The present disclosure prepares a titanium-doped sodium-ion battery cathode material by adding a heterogeneous element titanium, so as to suppress a phase change at the beginning of the charging of a sodium-ion battery, thereby improving the structure stability, output characteristic, and service life of the sodium-ion battery. Furthermore, by using XRD, EDS, XPS, SEM, and TEM to characterize the shape and structure of the titanium-doped cathode material, research and discussion are performed on the doping before and after titanium doping. The XPS results show that, the titanium-doped modified cathode material shows a stronger Mn—O bond and higher energy storage performance.

The process of preparing a sodium-ion battery precursor material of the present disclosure is a dry process, the addition of any complexant or binder is not required, and the addition of acidic or alkaline agents to regulate the pH is also not required, such that high concentration wastewater that is difficult to treat is not produced, thereby greatly reducing operating costs. Furthermore, the sodium-ion battery precursor material prepared in the present disclosure is at nanoscale (nm), simple in process step, easy in raw material obtaining, easy to implement, and suitable for large-scale production application. Embodiment:

A sodium-ion battery cathode material prepared by using the above method of the present disclosure was $Na(Ni_{0.25}Fe_{0.25}Mn_{0.5})_{0.97}Ti_{0.03}O_2$.

Comparative Example

Sodium-ion battery cathode material: $Na(Ni_{0.25}Fe_{0.25}Mn_{0.5})O_2$.

In order to confirm electrochemical performance of the embodiment and the comparative example, the above cathode material was used as a working electrode, indium was used as a counter electrode, 1.0M $NaClO_4$ was electrolyte, and cells in the embodiment and the comparative example were prepared under the same condition.

Figure 2A:
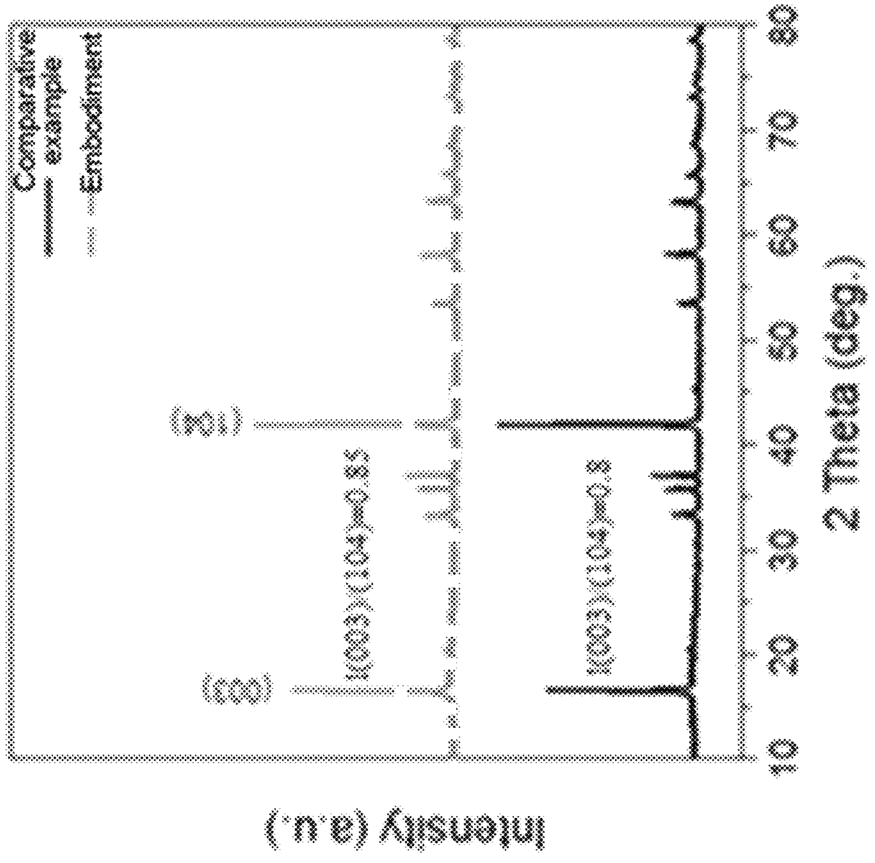
FIGS. 2A-2B are XRD determination result diagrams of a sodium-ion battery cathode material in an embodiment and a comparative example of the present disclosure.
Figure 2B:
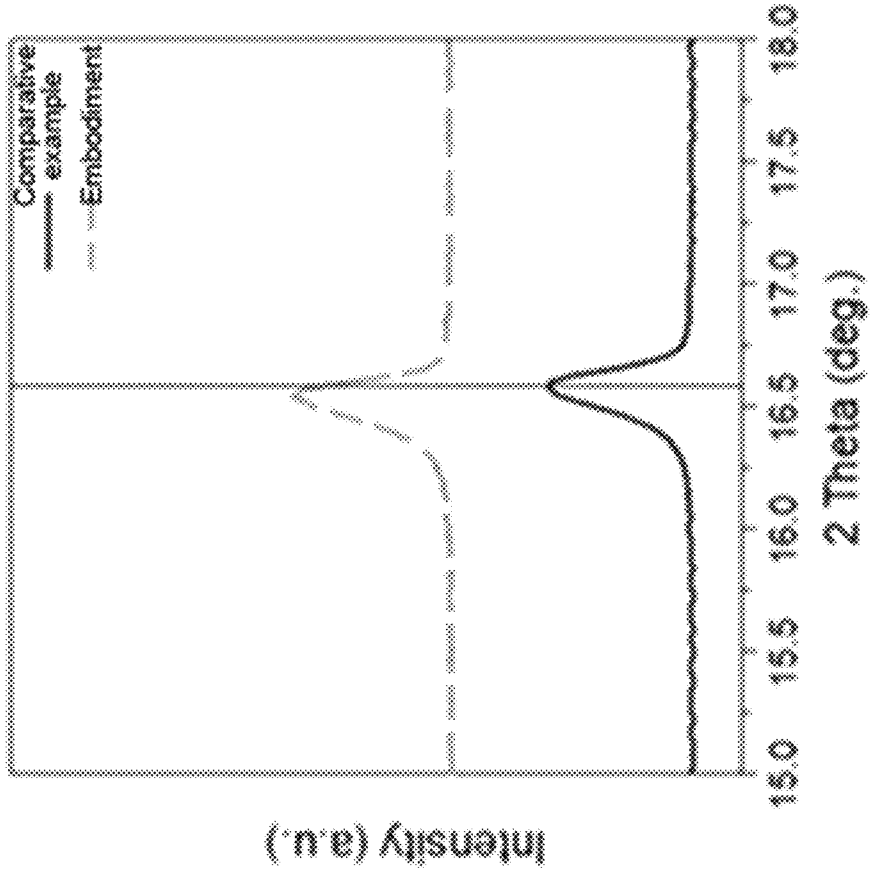

FIGS. 2A-2B were XRD determination result diagrams of a sodium-ion battery cathode material in an embodiment and a comparative example of the present disclosure. Table 1 was a table of lattice constants of the sodium-ion battery cathode materials in the embodiment and the comparative example of the present disclosure.

TABLE 1

| | Lattice constant a (A) | Lattice constant c (A) |
|---|---|---|
| Embodiment | 2.941 | 16.146 |
| Comparative example | 2.945 | 16.092 |

As shown in FIGS. 2A-2B and Table 1, in order to confirm whether a structure of the cathodeactive substance after Ti displacement changed, XRD determination was performed on the cathode active substance, and the results showed that no impurity was found. On the contrary, the Ti with a large ionic radius was displaced inside the structure, and it confirmed that a 003 peak moved toward a low angle. It confirmed that a mesh expanded to a c axis, a mesh value of the embodiment was 16.145 A, and a mesh value of the comparative example was 16.092 A.

Figure 3A:
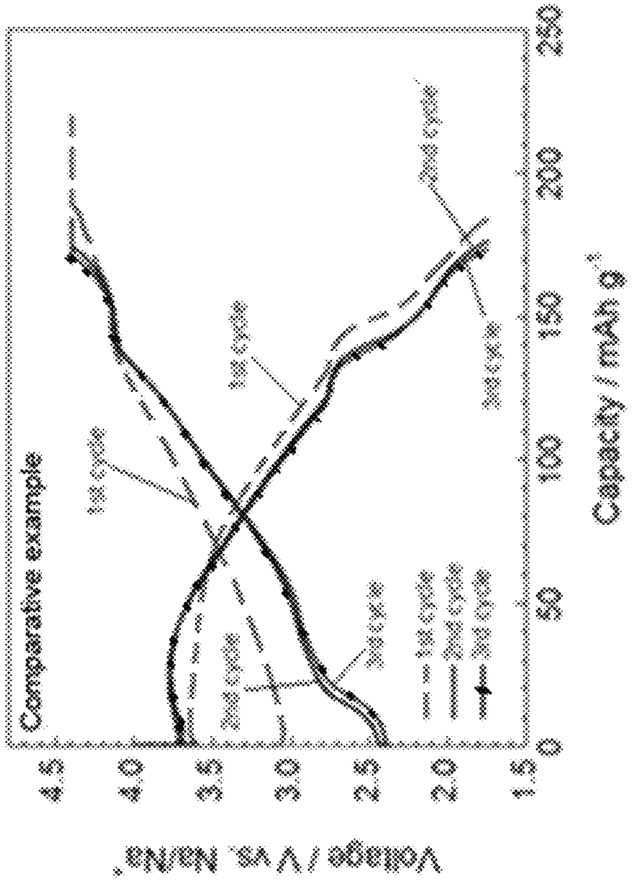
FIGS. 3A-3B are charging and discharging characteristic diagrams of a cell manufactured by a sodium-ion battery cathode material in an embodiment and a comparative example of the present disclosure.
Figure 3B:
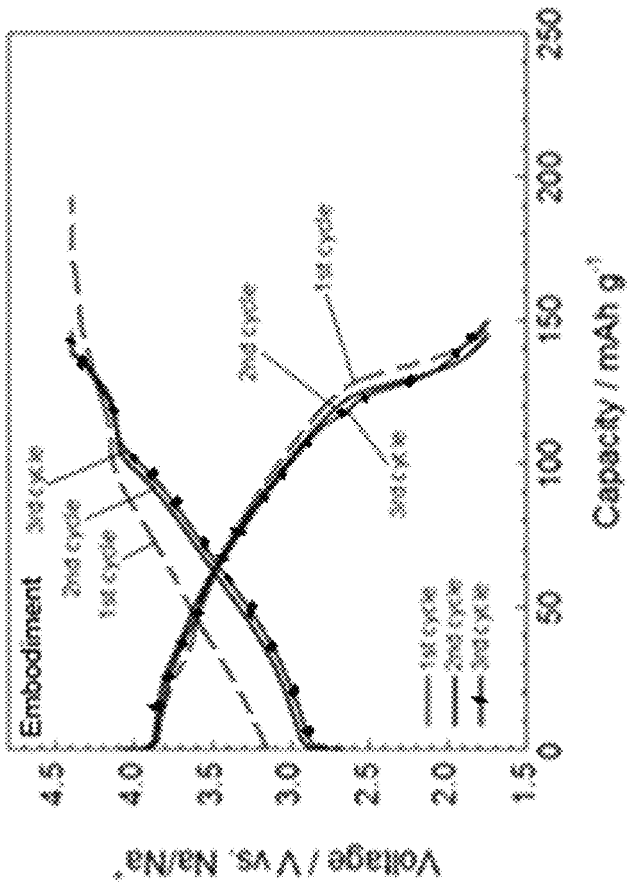

FIGS. 3A-3B were charging and discharging characteristic diagrams of a cell manufactured by a sodium-ion battery cathode material in an embodiment and a comparative example of the present disclosure. Table 2 was a table of initial charging and discharging capacities and efficiency of cells manufactured by a cathode active substance for a sodium-ion battery according to the embodiment and the comparative example of the present disclosure.

TABLE 2

| | Embodiment | | | Comparative example | | |
|---|---|---|---|---|---|---|
| | One cycle | Two cycles | Three cycles | One cycle | Two cycles | Three cycles |
| Charging capacity (mAh/g) | 192.6 | 145.2 | 145.8 | 219.8 | 183.9 | 180.0 |
| Discharging capacity (mAh/g) | 146.8 | 144.6 | 149.4 | 183.8 | 176 | 173.5 |
| Efficiency (%) | 76.2 | 99.6 | 102.4 | 83.6 | 95.7 | 96.4 |

As shown in FIGS. 3A-3B and Table 2, at an interval of 1.75 V-4.4 V, after 0.2 C mars conditions, charging/discharging was performed for 100 times at 0.5 C, and it confirmed that plateau in a 2.3 V region was burned at the beginning of charging after Ti displacement. Furthermore, it might confirm that an initial capacity of the embodiment was reduced compared to the comparative example, which was a phenomenon of Na ions trapped in the structure (Trapping) caused by Ti displacement.

Figure 4:
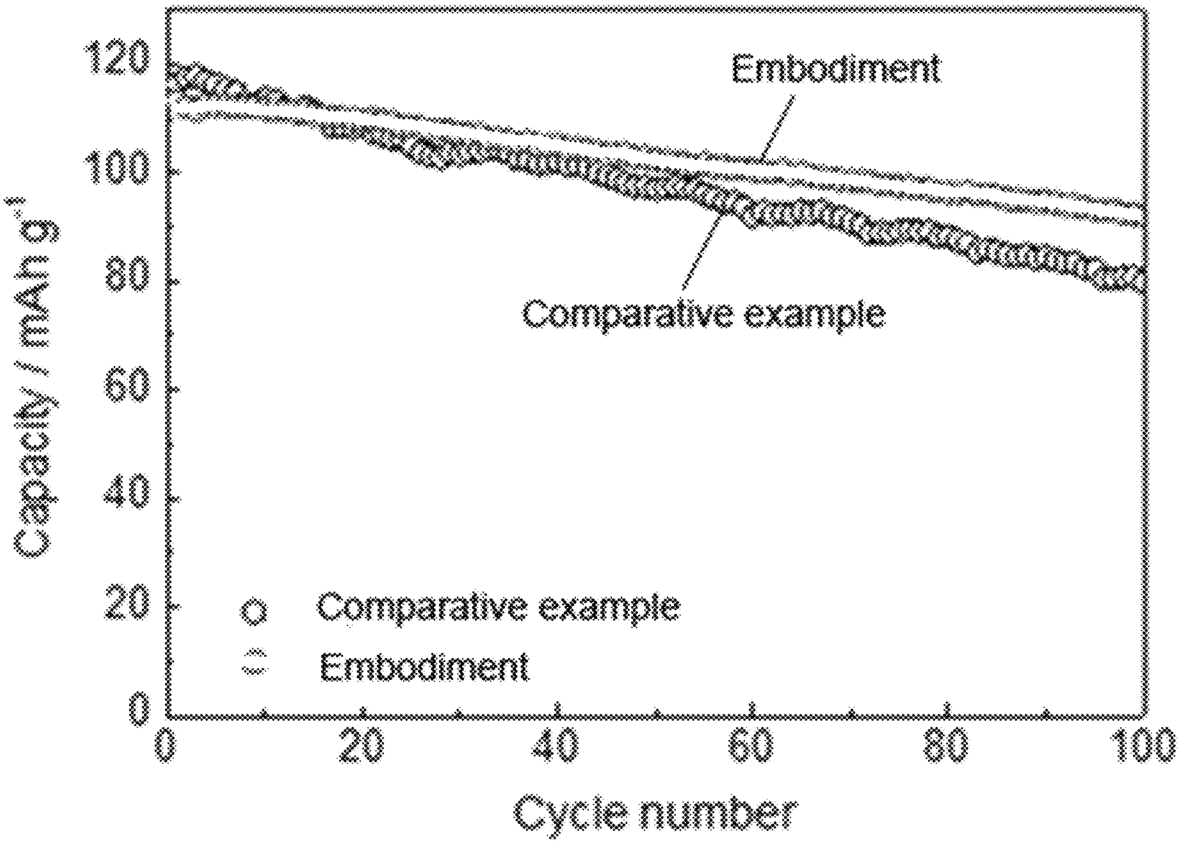
FIG. 4 is a characteristic diagram of the service life of a cell manufactured by a sodium-ion battery cathode material in an embodiment and a comparative example of the present disclosure.

FIG. 4 was a characteristic diagram of the service life of a cell manufactured by a sodium-ion battery cathode material in an embodiment and a comparative example of the present disclosure. Table 3 was a table that showed capacities and maintenance rates according to the course of service life.

TABLE 3

| | | One cycle | Fifty cycles | One hundred cycles |
|---|---|---|---|---|
| Embodiment | Capacity (mAh/g) | 113.2 | 102.4 | 92.0 |
| | Maintenance rate (%) | 100 | 90.5 | 81.3 |
| Comparative example | Capacity (mAh/g) | 116.3 | 97.0 | 79.9 |
| | Maintenance rate (%) | 100 | 83.4 | 68.7 |

As shown in FIG. 4 and Table 3, after 100 cycles of service life evaluation, the maintenance rate of the service life of the embodiment was 81.3%, and the maintenance rate of the service life of the comparative example was 68.7%, confirming that the service life characteristic after Ti displacement was effectively improved, through confirmation, which was because Ti displacement improved structure stability.

Figure 5:
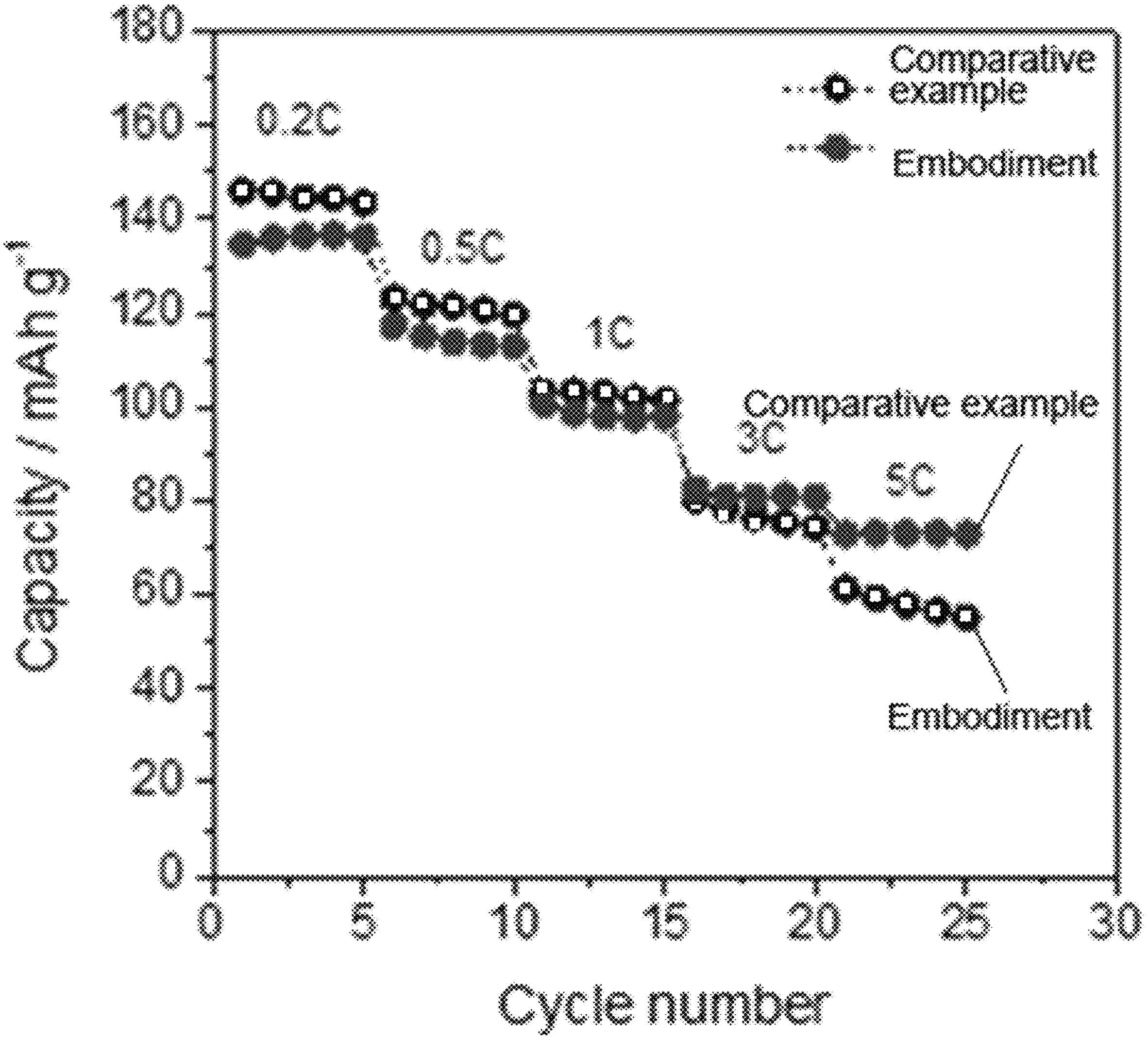
FIG. 5 is an output characteristic diagram of a cell manufactured by a sodium-ion battery cathode material in an embodiment and a comparative example of the present disclosure.

FIG. 5 is an output characteristic diagram of a cell manufactured by a sodium-ion battery cathode material in an embodiment and a comparative example of the present disclosure. Table 4 was a table of capacities and retention rates evaluated according to output characteristics.

TABLE 4

| | | 0.2 C | 0.5 C | 1 C | 3 C | 5 C |
|---|---|---|---|---|---|---|
| Embodiment | Capacity (mAh/g) | 134.6 | 117.3 | 100.6 | 82.4 | 72.8 |
| | Maintenance rate (%) | 100 | 87.1 | 74.8 | 61.2 | 54.1 |
| Comparative example | Capacity (mAh/g) | 145.9 | 123.3 | 103.2 | 80.3 | 61.4 |
| | Maintenance rate (%) | 100 | 84.5 | 70.8 | 55.1 | 42.1 |

As shown in FIG. 5 and Table 4, in order to confirm whether Ti displacement led to changes in output characteristics, changing and discharging were performed for 5 times each at different current densities from 0.2 C to 5 C.

As shown in FIG. 5, there was not much difference in capacity at low current densities below 1 C. However, as the current density increased, the capacity of the comparative example sharply decreased, and the embodiment showed excellent output characteristics. At the current density of 5 C, the capacity retention rate was 54.1% in the embodiment, and was 42.1% in the comparative example. Power characteristics were improved because of the lattice expansion due to Ti displacement, leading to unimpeded movement of ions at high current densities, and thereby achieving a stable structure.

The above are only the preferred embodiments of the present disclosure and are not intended to limit the present disclosure. For those skilled in the art, the present disclosure may have various modifications and variations. Any modifications, equivalent replacements, improvements and the like made within the spirit and principle of the present disclosure all fall within the scope of protection of the present disclosure.

What is claimed is:

1. A method for preparing a sodium-ion battery cathode material, comprising:
 - compounding metal salt solutions to obtain a mixed metal salt solution, wherein the mixed metal salt solution comprises one of a chloride solution, a sulfate solution, and a nitrate solution, and metal sources in the mixed metal salt solution comprise one or more of nickel (Ni), iron (Fe), and manganese (Mn);
 - performing a spray pyrolysis on the mixed metal salt solution to obtain a first precursor powder;
 - mixing the first precursor powder with an isopropanol solvent to obtain a first mixed solution;
 - dispersing nano-scale titanium dioxide into the first mixed solution to obtain a second mixed solution;
 - drying the second mixed solution to obtain a second precursor powder; and
 - mixing the second precursor powder with a sodium source for sintering to obtain the sodium-ion battery cathode material.

2. The method for preparing the sodium-ion battery cathode material according to claim 1, wherein a structure of the sodium-ion battery cathode material is $NaM_{1-x}Ti_xO_2$; and in the $NaM_{1-x}Ti_xO_2$, M is selected from at least one of the Ni, the Fe, or the Mn, and $0.01<x<0.1$.

3. The method for preparing the sodium-ion battery cathode material according to claim 2, wherein process parameters for the spray pyrolysis comprise:
 - the mixed metal salt solution is sampled through a pneumatic nebulization, and a pressure range of a compressed air is 1-5 $kg/cm^2$;
 - a feeding rate of solution droplets is 5-35 L/min, a particle size range of the solution droplets is $0<D_{50}<300$ μm, and a falling speed of the solution droplets in a baking furnace is 5-40 m/s; and
 - a furnace chamber temperature of the baking furnace is 300° C.-1000° C., and a retention time of the solution droplets in a furnace chamber is 10-30 s.

4. The method for preparing the sodium-ion battery cathode material according to claim 3, wherein the process parameters for the spray pyrolysis further comprise:
 - a combustion-supporting gas of the baking furnace is natural gas, and a nozzle diameter for the spray pyrolysis is 1-3 mm.

5. The method for preparing the sodium-ion battery cathode material according to claim 3, wherein the feeding rate of the solution droplets is 7-15 L/min, and the furnace chamber temperature of the baking furnace is 500° C.-800° C.

6. The method for preparing the sodium-ion battery cathode material according to claim 2, wherein a post-treatment of the first precursor powder comprises:
 - a washing: wherein a chloride ion concentration in water is <1 ppm, a washing solid-liquid ratio is 1:10, and a number of times for the washing is ≥2;
 - a drying: wherein a drying temperature is 90° C.-100° C.;
 - a crushing: wherein the crushing is performed by using a crushing and grinding basket through a zirconia grinding disc; and
 - a screening: wherein the screening uses a 100-200-mesh sieve.

7. The method for preparing the sodium-ion battery cathode material according to claim 2, wherein a drying temperature of the second mixed solution is 40-80° C.

8. The method for preparing the sodium-ion battery cathode material according to claim 2, wherein the sodium source is sodium carbonate or sodium sulfate, and a molar mass ratio of sodium atoms to a total molar mass ratio of mixed metals in the second precursor powder is 0.9-1.0.

9. The method for preparing the sodium-ion battery cathode material according to claim 2, wherein the second precursor powder and the sodium source are mixed and baked for 14-34 h at 760-960° C. to obtain the sodium-ion battery cathode material.

10. The method for preparing the sodium-ion battery cathode material according to claim 2, further comprising:
 - cooling a sintered sodium-ion battery cathode material to a room temperature, and performing a crushing, a grinding, and a sieving.

11. The method for preparing the sodium-ion battery cathode material according to claim 1, wherein process parameters for the spray pyrolysis comprise:
 - the mixed metal salt solution is sampled through a pneumatic nebulization, and a pressure range of a compressed air is 1-5 $kg/cm^2$;
 - a feeding rate of solution droplets is 5-35 L/min, a particle size range of the solution droplets is $0<D_{50}<300$ μm, and a falling speed of the solution droplets in a baking furnace is 5-40 m/s; and
 - a furnace chamber temperature of the baking furnace is 300° C.-1000° C., and a retention time of the solution droplets in a furnace chamber is 10-30 s.

12. The method for preparing the sodium-ion battery cathode material according to claim 11, wherein the process parameters for the spray pyrolysis further comprise:
 - a combustion-supporting gas of the baking furnace is natural gas, and a nozzle diameter for the spray pyrolysis is 1-3 mm.

13. The method for preparing the sodium-ion battery cathode material according to claim 11, wherein the feeding rate of the solution droplets is 7-15 L/min, and the furnace chamber temperature of the baking furnace is 500° C.-800° C.

14. The method for preparing the sodium-ion battery cathode material according to claim 1, wherein a post-treatment of the first precursor powder comprises:
 - a washing: wherein a chloride ion concentration in water is <1 ppm, a washing solid-liquid ratio is 1:10, and a number of times for the washing is ≥2;
 - a drying: wherein a drying temperature is 90° C.-100° C.;
 - a crushing: wherein the crushing is performed by using a crushing and grinding basket through a zirconia grinding disc; and
 - a screening: wherein the screening uses a 100-200-mesh sieve.

15. The method for preparing the sodium-ion battery cathode material according to claim 1, wherein a drying temperature of the second mixed solution is 40-80° C.

16. The method for preparing the sodium-ion battery cathode material according to claim 1, wherein the sodium source is sodium carbonate or sodium sulfate, and a molar mass ratio of sodium atoms to a total molar mass ratio of mixed metals in the second precursor powder is 0.9-1.0.

17. The method for preparing the sodium-ion battery cathode material according to claim 1, wherein the second precursor powder and the sodium source are mixed and baked for 14-34 h at 760-960° C. to obtain the sodium-ion battery cathode material.

18. The method for preparing the sodium-ion battery cathode material according to claim 1, further comprising:

cooling a sintered sodium-ion battery cathode material to a room temperature, and performing a crushing, a grinding, and a sieving.

* * * * *